United States Patent [19]

Thiery et al.

[11] 3,858,616
[45] Jan. 7, 1975

[54] TIGHT FLEXIBLE PIPE

[75] Inventors: Jean Thiery, Le Pecq; Michel Chatard, Chatou; Michel Huvey, Bougival; Gerard Bonavent, Rueil-Malmaison, all of France

[73] Assignee: Institut Francais du Petrole, des Carburants et Lubrifiants

[22] Filed: Nov. 27, 1973

[21] Appl. No.: 419,354

[30] Foreign Application Priority Data
Dec. 8, 1972 France .............................. 72.43797
May 16, 1973 France .............................. 73.17842

[52] U.S. Cl. .............................................. 138/133
[51] Int. Cl. ............................................. F16l 11/08
[58] Field of Search .......... 138/138, 140, 141, 143, 138/144, 145, 146, 147, 148, 153, 127, 133

[56] References Cited
UNITED STATES PATENTS
3,559,693   2/1971   Reynard ......................... 138/144 X FOREIGN PATENTS OR APPLICATIONS
277,974   7/1964   Australia ............................ 138/140

Primary Examiner—Jerry W. Myracle
Attorney, Agent, or Firm—Craig & Antonelli

[57] ABSTRACT

This pipe comprises two layers of profiled rods helically wound in opposite directions.

The cross section of these profiled rods is such as to delimit between opposite walls of adjacent rods substantially confined spaces filled with a tightening resilient material which adheres to these opposite walls.

35 Claims, 5 Drawing Figures

TIGHT FLEXIBLE PIPE

The present invention relates to a tight flexible pipe. More particularly, but not limitatively, the present invention concerns a tight flexible pipe which can be used as a drill pipe for carrying out the so-called "flexodrilling process," but other uses may be devised, such as, for example, conveying fluids (for example hydrocarbons).

Pipes suitable for the flexodrilling proocess usually comprise:

a first metal armouring withstanding crushing stresses due to the difference between the pressures prevailing respectively inside and outside the pipe, a first flexible sheath, of plastic or elastomeric material, for the internal tightening of the pipe, a second metal armouring withstanding tractive and-/or torsional stresses applied to the pipe, and a second flexible sheath of plastic or elastomeric material, for the tightening of the pipe with respect to the surrounding medium.

Optionally, an additional sheath provides for the electric insulation of one of the armourings which may then be used as an electric conductor, for example for transmitting signals between a surface installation and apparatuses connected to the lower end of the flexible pipe.

One of the main objects of the second sheath is to prevent the fluid forming the surrounding medium to directly exert its pressure on the first sheath.

Accordingly any liability of deformation through crushing of the first sheath is avoided when, the latter being the innermost layer of the pipe, the pressure prevailing outside the pipe is greater than the inner pressure thereof.

In a first embodiment of prior art flexible drill pipes, the second sheath is placed between the two metal armourings which withstand the stresses applied to the pipe. As a result therefrom, it is impossible during the drilling operations to properly obturate the drilled borehole by means of the blow out preventers (B.O.P.) of conventional type which equip the wellheads. As a matter of fact, fluid leakages occur along a direction parallel to the pipe axis, at the location of the B.O.P., such leakages resulting from the clearance between the wires forming the external armouring of the pipe.

To obviate this drawback, according to a second embodiment of the prior art flexible drill pipes, the second sheath surrounds the outermost metal armouring.

It becomes then possible to achieve the obturation of a wellbore with a B.O.P. during the drilling processes. Other drawbacks are however encountered; they result mainly from the poor resistance of this second sheath to the stresses generated by the devices for gripping the blow out preventers or by the special equipments used for handling the flexible drill pipe, such special equipments comprising gripping shoes which exert clamping forces radially directed onto the pipe.

Any local failure, at the level of the B.O.P. or at any lower level, will suppress irremediably, and within a short time interval, the sealing provided by the B.O.P. around the flexible pipe and the tightness on the outer wall of the pipe; this is a very serious inconvenience, particularly in the case of a flowing well, and in any case, it requires at least to discontinue the drilling operations and to replace the flexible pipe portion whose outer covering is damaged.

The main object of the present invention is accordingly to provide a flexible pipe which can be, in particular, used as a drill pipe and does not suffer from the above indicated drawbacks.

The invention will be clearly understood and the advantages thereof will be made apparent from the following description of particular, non-limitative embodiments of flexible pipes illustrated by the accompanying drawings, wherein :

FIG. 1 diagrammatically illustrates the structure of a flexible drill pipe according to the invention.

Figure 1:
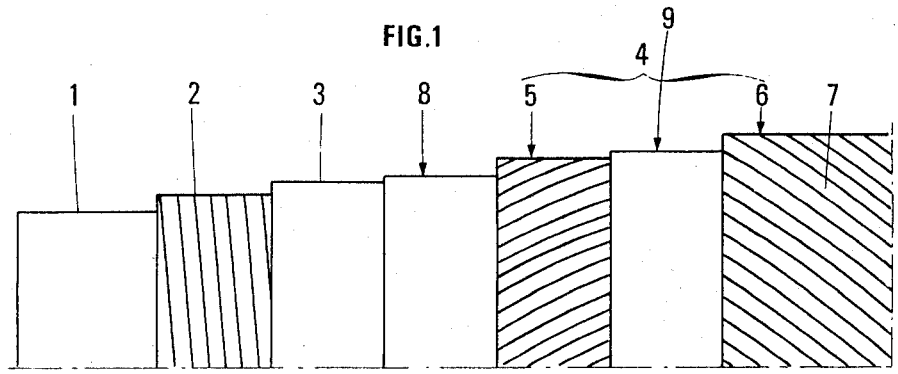

FIG. 1 diagrammatically illustrates a flexible drill pipe according to the invention, which comprises from the inside to the outside:

a flexible and tight tubular core 1, a pressure-withstanding armouring, a flexible and tight tubular sheath 3, and a tight armouring 4 withstanding tractive and/or torsional stresses applied to the pipe.

The tubular core 1 which provides for the internal tightness of the pipe, is constituted by a resilient material capable of withstanding chemical and mechanical actions.

The armouring 2, which surrounds the core 1 is, for example, constituted by the helical winding with a small pitch, of a metal strip having a S- or Z-shaped cross-section forming interlocking convolutions.

The sheath 3 which covers the armouring 2 is made of a resilient material. In addition to its effect of the electrically insulating the metal armouring 2, the sheath 3 facilitates the relative sliding of the armourings 2 and 4 on each other and also constitues a safety lining tightening the pipe with respect to the surrounding medium.

In the considered case of a drill pipe, the tubular core 1 and the sheath 3 will preferably be made of Rilsan (Trade name for polyamide 11) which seems to give the best results.

The armouring withstanding the traction and/or torsional stresses is preferably formed of two layers 5 and 6 of strips or preformed rods 7.

These two layers are helically wound in opposite directions with a high winding pitch.

Optionally the layer 5 will lay on a separating layer 8 covering the sheath 3 and the layer 6 will optionally lay on a separating layer 9 covering the layer 5.

These optional separating layers, whose utility will appear later on, are formed by helically winding a very thin strip (some hundredths of a millimeter) of a material whose composition will be indicated hereunder.

Figure 2:
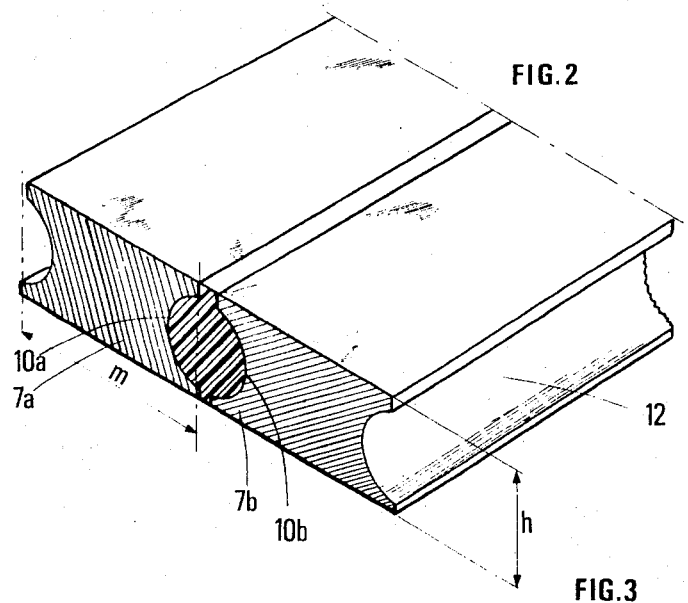
FIG. 2 illustrates, on a larger scale, two adjacent rods of a traction-withstanding armouring.

FIG. 2 shows, in cross-section, two consecutive strips $7a$ and $7b$ respectively constituting the layers 5 and 6 of the armouring 4. According to the invention, these strips $7a$ and $7b$ are given such a cross-section that the adjacent walls $10a$ and $10d$ delimit substantially closed or confined spaces, such as 12, when the strips are helically wound. Each of these spaces houses a deformable material which ensures the tighness of each armouring layer by obturating these substantially closed or confined spaces.

Figure 3:
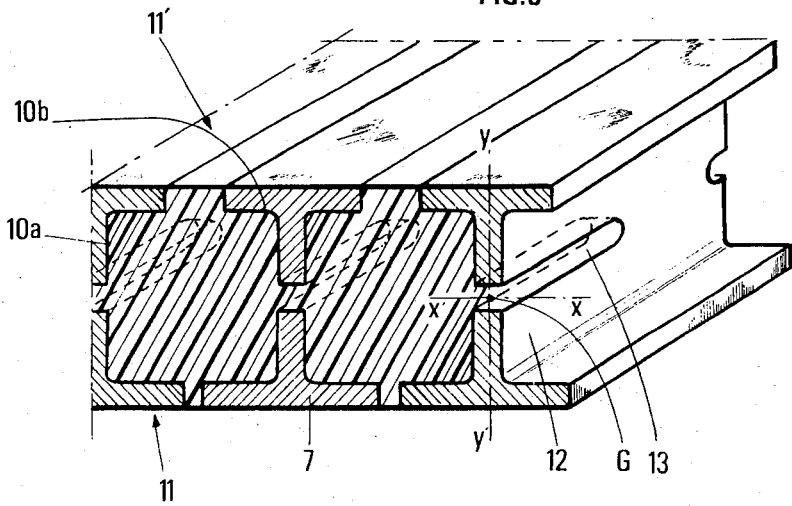
FIG. 3 illustrates, also on a larger scale a preferred shape for the rods constituting the layers of the traction-withstanding armouring.
Figure 4:
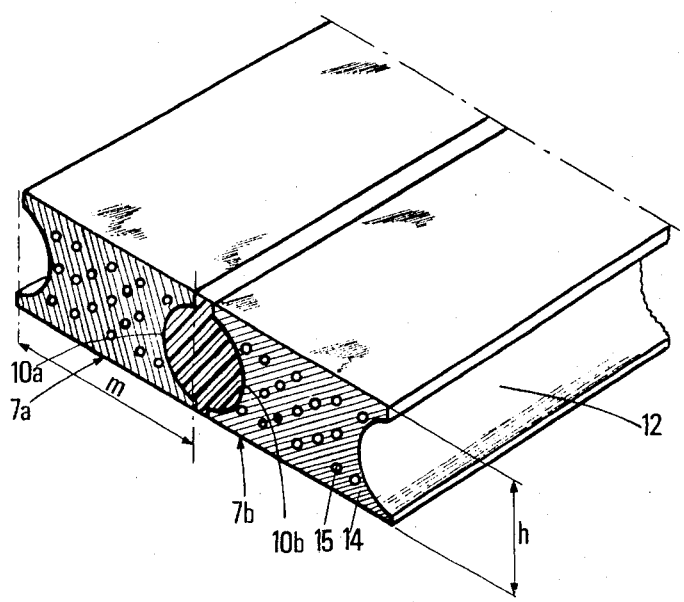
FIGS. 4 and 5 illustrate rods made of non-metallic materials.
Figure 5:
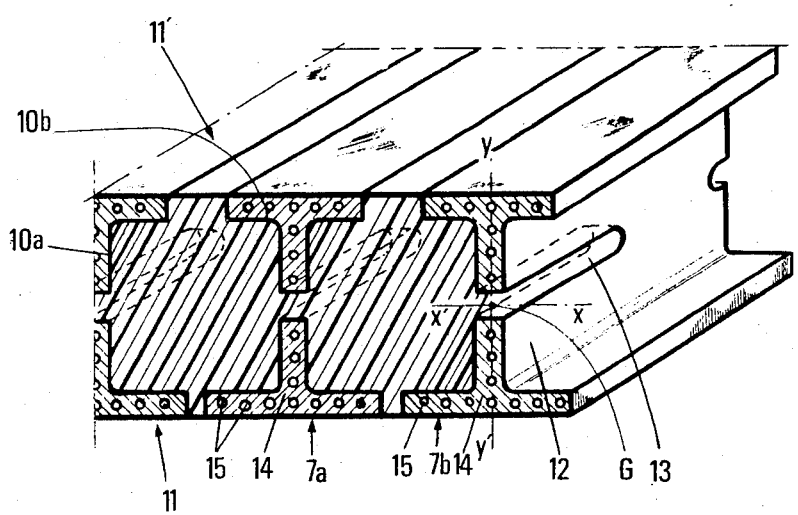

FIG. 3 illustrates a preferred shape for the cross-section of the rods 7.

As illustrated in FIG. 2, strips having a width m greater than their thickness h sometimes give the armouring a certain mechanical instability resulting from the difficulty for these strips to adapt themselves to variations in their winding pitch when the flexible pipe is subjected to a bending stress.

It has been ascertained that such instability is pratically avoided when the height h of these rods is greater than their width m, by using rods whose cross-section relatively to a transverse axis X'X (FIG. 3) passing through the centre of gravity G of the cross-section has a moment of inertia $M_m$ whose value is maximum, as compared with the values of the moments of inertia relative to the other axes passing through G, said rods being so positioned that the radius Y'Y of the pipe passing through the centre of gravity of their cross-section be substantially perpendicular to the transverse axis X'X. The width and the height $h$ and $m$ of the cross-section will preferably be so selected that the ratio of the moment of inertia $M_m$ of the cross-section with respect to X'X to the moment of inertia $M_p$ of this cross-section with respect to the axis Y'Y be from 1.5 to 2.

For this reason, it is preferred, according to the invention, to use rods 7 having a substantially I-shaped cross-section whose central body is oriented along a substantially radial direction with respect to the pipe, the wings of these I-shaped cross-section defining between adjacent rods substantially confined spaces in which the tightening material is introduced. Elongated openings 13 may optionally be provided through the central part of the I-shaped rods to make the different confined spaces communicate with each other and circumferentially bindings the material filling such spaces.

As illustrated by FIG. 3, the rods 7 define for each armouring layer a substantially continuous internal surface 11.

By this way, each of the armouring layers 5 and 6 is tight.

From the foregoing, it is clearly apparent that the external surface 11' of the outermost armouring layer 6 does not cover the upper walls of the profiled rods. Thus the gripping shoes of the handling apparatus are directly in contact with the profiled rods which, on the one hand, prevents any deterioration of the material filling the confined spaces, and, on the other hand, permits a better gripping action on the flexible pipe. Furthermore, it must be observed that, since the outer surface 11' of the armouring layer is also continuous, it is possible, in the course of drilling operation, to obturate the drilled wellbore by means of conventional blow out preventers.

The rods 7 which constitute each of the armouring layers 5 and 6 may be made of a metallic material having good mechanical properties and preferably also a good resistance to the corrosion action of the medium with which they are in contact.

However, when it is important to manufacture tight flexible pipes of low weight, the preformed rods 7 may be made of a resin matrix provided with reinforcements of substantially parallel filaments 15 having a high elasticity modulus and which are not, or only slightly, twisted. The matrix may be a thermosetting resin, such as a formophenolic resin, an unsaturated polyester or an epoxy resin, this list being by no way limitative, or a thermoplastic resin whose temperature of vitrous transition is at least 30°C greater than the temperature of use of the pipe, for example phenylpolyoxide or polysulfone resin, this list being also not limitative.

The reinforcement may be constituted by fibers having a high elasticity modulus, in the form of continuous filaments and/or fabrics and/or felts or cushions of cut fibers. The filaments constituting the reinforcements may be glass fibers, organic fibers having an elasticity modulus of at least 700,000 bars, particularly carbon fibers or also metal wires.

The proportion of filaments will preferably be high (greater than 30 percent in volume), in order to obtain an elasticity modulus and a resistance which are as high as possible.

The filaments are subjected to a surface treatment by a product providing a proper adherence of the matrix onto the filaments so as to obtain a maximum reinforcing effect.

The so constituted material is used in the form of profiled rods of great lengths and constant section.

The profiled rods are obtained by continuous drawing through a hot die of suitable cross section or according to any other similar process providing profiled rods of constant cross-section and great length units. For the determination of the cross-section of the profiled rods of reinforced plastic which constitute the layer 6 (external layer) we will consider that these rods are subjected to pure tractive stresses. It can thus be assumed that the only important factor for using profiled rods according to the invention lie in the resistance to traction of the armoured plastic. This resistance being very high ( $\geq$ 100 hectobars), the profiled rod of reinforced plastic may have a limited cross-section. In the case of the armouring layer 5 (internal layer for withstanding tractive and torsional stresses) the stresses in service are of two kinds: pure tractive stresses and torsional stresses which tend to cause buckling of the profiled rod. In order to avoid this buckling, it is important that the stiffness of the profiled rod subjected to buckling stresses be sufficient to resist to such stresses under operative conditions.

The minimum required cross-section will thus be calculated as a function of the buckling stresses and this calculated value of the cross-section is greater than that determined for the layer 6, the value of the cross-section of the rods of layer 5 will be selected as a function of the resistance to buckling; otherwise the same cross-section will be selected for the rods of layer 5 and for the rods of layer 6.

Thus, according to the different stresses applied to the two layers 5 and 6, these two layers will be formed by profiled rods having identical or different cross-sections, the cross-section of the rods of layer 5 being equal to or greater than that of the rods of layer 6. It has been ascertained that, irrespective of the nature of the material constituting the profiled rods 7, in order that the material filling the substantially closed spaces between adjacent rods provides for a good tightness of each armouring layer, there must be selected a material optionally capable to adhere to the surfaces such as 10a and 10b (FIGS. 2 and 3) which has a sufficient cohesion for not being extruded, in the case where an axial pressure is exerted, and having an elasticity modulus which is small enough for permitting relative displacements of the profiled rods of each armouring layer which will occur every time the pipe is bended.

In the case of flexible drill pipes, this material will also keep these qualities in a temperature range of about −40°C to +120°C. Good results have been obtained by using materials which in the tempereature range of use of the flexible pipe have under twisting, an elasticity modulus from 5 to 500 kg/cm², a resistance to traction of at least 50 kg/cm² and preferably greater than 90 kg/cm² and a resistance to tearing of at least 10 kg/cm².

The material filling the substantially closed spaces between the profiled rods 7 may be selected in the following non-limitative list of materials:

polydienic elastomers, such as natural rubber, polyisoprene, polybutadiene and its copolymers (S.B.R, nitrile rubber), the sequenced butadiene-styrene copolymer (thermoplastic elastomer), the ethylene-propylene copolymers, the chlorosulfonated polyethylenes, fluoro-elastomers, thioelastomers or polysulphur elastomers, polyurethanes, flexible epoxy-resins, polyamides, etc The optional use of the layers 8 and 9 will be justified when the degree of bending of the pipe in operation requires an important relative freedom between the lining 3 and the layer 5, on the one hand, and between the layer 5 and the layer 6, on the other qand. In this case, the material constituting the layer 8 will be such that it does adhere either to the material constituting the lining 3, or to the material filling the substantially closed spaces of the layer 5 and to the material constituting the profiled rods 7. Similarly, the material constituting the layer 9 will be so selected that it does not adhere to the material filling the substantially closed spaces of the layers 5 and 6 or to the material constituting the profiled rods 7. When the material filling the substantially closed spaces is constituted by polychloroprene, the material constituting the layer 9 may for example be polyethylene glycol terephthalate (sold under the trades names Terphane, Mylar, Melinex, etc ... ).

Generally speaking, when the resilient material filling the substantially closed or confined spaces is a polydiene elastomer, a flexible epoxy resin or a polyurethane, each separating layer will be made of polyethylene glycol terephthalate.

In the case where the resilient material filling the substantially closed spaces in a polysulphur elastomer, each separating layer will be constituted of high density polyethylene (density from 0.94 to 0.96).

The tightness with respect to the external medium being achieved by introducing the tightening material between the convolutions of the outermost armouring, it is possible in this manner to obtain a pipe having an external diameter which is smaller than that of the prior art pipes having the same performances.

The pipes according to the invention may also be used for conveying fluids such as hydrocarbons, especially when these pipes must be immerged at great depths. Obviously changes may be made without departing from the scope of the present invention. It will, for example, be possible to omit the separating layer 9 and only to fill the spaces between the rods constituting the outer armouring layer 6. The layer 8 can also be omitted when, the material forming the lining 3 and that introduced into the layer 5 do not adhere to each other under the temperature and pressure conditions corresponding to the introduction, and to the optional treatment, of the material filling the substantially closed spaces of the layer 5.

It will also be possible, depending on the conditions of use of the pipe, either to omit the tubular core 1, the internal tightness of the pipe being achieved by the lining 3, or to omit the lining 3. Other armourings may be added, provided that, in all cases, the outermost armouring comprises substantially closed spaces in which is introduced a material ensuring the external tightening of the pipe.

Obviously the layer 2 may be formed by a metallic or non-metallic profiled rod wound with a small pitch. The cross-section of the profiled rod being or not adapted for the interlocking of adjacent convolutions.

Since the armouring layer 2 is subjected to radial stresses due to the effect of the internal and external pressures applied to the pipe, the geometrical characteristics of the profiled rod will be so determined as to provide a resistance to internal and external pressures which is higher than those prevailing under operating conditions.

In the case where hydraulic or electric lines for transmitting power or data are incorporated to the pipe, it will be possible to position such lines in one or several of the confined spaces delimited between the adjacent profiled rods of at least one of the armouring 4, these lines being embedded in the resilient material filling these confined spaces.

We claim:

1. A tight flexible pipe comprising at least one flexible sheath, at least one first flexible armouring withstanding crushing stresses, said flexible sheath ensuring the internal tightness of the pipe and being in contact with one of the internal and external walls of said first armouring and at least one second armouring, surrounding the assembly constituted by said flexible sheath and said first armouring, said second armouring withstanding tractive and/or bending stresses applied to the pipe and comprising at least one layer of preformed rods which are helically wound with a high winding pitch, said rods having such a profiled cross-section that the walls of adjacent rods of said layer which face each other delimit between each other substantially confined spaces and wherein each of said space is filled with a resilient material ensuring the tightness of the pipe between said rods of said layer of said second armouring.

2. A flexible pipe according to claim 1, wherein said resilient material adheres to said walls of said rods which delimit said substantially confined spaces.

3. A flexible pipe according to claim 2, wherein said material filling said substantially confined spaces provided between the consecutive rods of said layer constituting said second armouring has, in the temperature range of utilization of the flexible pipe, an elasticity modulus, with respect to twisting, from 5 to 500 kg/cm².

4. A flexible pipe according to claim 3, wherein said material has a resistance to traction of at least 50 kg/cm² and preferably more than 90 kg/cm².

5. A flexible pipe according to claim 4, wherein said material has a resistance to tearing of at least 10 kg/cm².

6. A flexible pipe according to claim 5, wherein said resilient material filling said confined spaces is made of a polydienic elastomer.

7. A flexible pipe according to claim 6, wherein said resilient material filling said confined spaces is polychloroprene.

8. A flexible pipe according to claim 6, wherein said resilient material filling said substantially confined spaces is a sequenced polymer of butadiene and styrene.

9. A flexible pipe according to claim 1, comprising a first separating layer covering substantially the whole internal wall of said layer.

10. A flexible pipe according to claim 9, wherein said separating layer is formed by the helical winding of a thin strip, with overlapping of the adjacent convolutions formed by said strip.

11. A flexible pipe according to claim 10, wherein said separating layer is made of a material which adheres neither to the resilient material filling said substantially confined spaces nor to said profiled rods.

12. A flexible pipe according to claim 11, wherein said separating strip is made of polyethylene glycol terephthalate.

13. A flexible pipe according to claim 11, wherein said separating strip is made of high density polyethylene.

14. A flexible pipe according to claim 11, wherein the proportion of filaments in said matrix is of at least 30 percent per volume.

15. A flexible pipe according to claim 1, wherein said second armouring comprises two layers of rods, helically wound in opposite directions with a high pitch, comprising a single thin separating layer covering substantially the whole inner wall of the outermost layer of said second armouring and wherein said substantially confined spaces delimited between adjacent rods of said outermost layer are filled with a resilient material which adheres to the walls of the rods defining said substantially confined spaces.

16. A flexible pipe according to claim 1, wherein the cross-section of each of said rods, has, with respect to a transverse axis passing through its centre of gravity, a moment of inertia whose value is greater than the values of the moment of inertia of this cross-section measured with respect to the other axes passing through the centre of gravity of this cross-section and wherein each of the rods is so positioned that the radius of the pipe passing through the centre of gravity of the cross-section of the rod is perpendicular to said transverse axis.

17. A flexible pipe according to claim 16, wherein the ratio between the moment of inertia of the cross-section of each rod, with respect to said transverse axis, and the moment of inertia of this cross-section, with respect to the radius of the pipe which passes through the centre of gravity of said cross-section and is perpendicular to said transverse axis, is from 1.5 to 2.

18. A flexible pipe according to claim 1, wherein said rods have a substantially I-shaped cross-section whose central part is positioned substantially along a radial direction with respect to the flexible pipe.

19. A flexible pipe according to claim 18, further comprising in the central part of the I-shaped cross-section, to establish communication between the adjacent substantially confined spaces.

20. A flexible pipe according to claim 1, wherein said rods with a profiled cross-section are metal rods.

21. A flexible pipe according to claim 1 wherein the profiled rods are made of a resin provided with a reinforcement constituted by substantially parallel filaments having a high elasticity modulus and which are not substantially twisted.

22. A flexible pipe according to claim 21, wherein the resin constituting said matrix is a thermosetting resin.

23. A flexible pipe according to claim 21, wherein the resin constituting said matrix is a thermoplastic resin.

24. A flexible pipe according to claim 21, wherein the filaments reinforcing the resin are continuous filaments.

25. A flexible pipe according to claim 21, wherein the filaments reinforcing the resin are glass fibers.

26. A flexible pipe according to claim 25, wherein the glass fibers are pretreated so as to adhere to the resin.

27. A flexible pipe according to claim 21, wherein the fiber of high elasticity modulus which reinforces the resin is a continuous organic fiber having an elasticity modulus of at least 700,000 bars.

28. A flexible pipe according to claim 27, wherein the organic fiber is so pretreated as to adhere to the resin.

29. A flexible pipe according to claim 27, wherein said organic fiber is a carbon fiber.

30. A flexible pipe according to claim 21, wherein the filaments reinforcing the resin are metallic wire.

31. A tight flexible pipe suitable as drill pipe, comprising an electrically insulating flexible tubular core providing for the internal tightness of the pipe, a first armouring resisting to crushing stresses, formed by the helically winding, with a small pitch, a strip around said tubular core, a flexible electrically insulating sheath covering said first armouring and a second armouring withstanding tractive and/or torsional stresses applied to the pipe, said second armouring covering said flexible sheath and being constituted by two layers of preformed rods, said layers being helically wound in opposite directions with a high winding pitch, said tubular core and said sheath being made of polyamide 11, the rods of each layer of said second armouring having such a profiled cross-section that the walls of consecutive rods delimit between each other substantially confined spaces and each of said spaces being filled by a resilient material capable of ensuring the tightness of the pipe between said adjacent rods.

32. A flexible pipe according to claim 31, wherein said profiled rods have a substantially I-shaped cross-section whose length is oriented substantially along a radius of the pipe.

33. A flexible pipe according to claim 31, comprising two separating layers formed by the winding of a thin layer of a material containing polyethylene glycol terephthalate with partial overlapping of the successive convolutions, one of said separating layers being interposed between said sheath and said second armouring, and the other layer separating the two layers of rods constituting said second armouring.

34. A flexible pipe according to claim 31, wherein said substantially confined spaces are filled with a resilient material adhering to said walls of the rods and constituted by a polychloroprene elastomer containing reinforcing and vulcanizing charges in suitable proportions for obtaining the desired mechanical and thermal properties.

35. A flexible drill pipe according to claim 31, comprising power and/or data transmission lines, said lines being housed in at least one of said substantially confined spaces and being embedded in said resilient material filling said substantially confined spaces.

* * * * *

UNITED STATES PATENT OFFICE
CERTIFICATE OF CORRECTION

Patent No. 3,858,616  Dated January 7, 1975

Inventor(s)  Jean THIERY, et al

It is certified that error appears in the above-identified patent and that said Letters Patent are hereby corrected as shown below:

Claim 14, line 1, change "according to claim 11" to -- according to claim 21 --.

Claim 19, line 2, after "comprising" insert -- openings --.

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*